's Patent [19]

Gruna

[11] Patent Number: 4,555,134
[45] Date of Patent: Nov. 26, 1985

[54] CRUSH RESISTANT MOTOR VEHICLE BODY

[75] Inventor: Leo Gruna, P2-5B Panther Valley, Hackettstown, N.J. 07840

[73] Assignee: Leo Gruna, Hackettstown, N.J.

[21] Appl. No.: 515,516

[22] Filed: Jul. 20, 1983

[51] Int. Cl.⁴ .................. B62D 25/02; B62D 29/04
[52] U.S. Cl. ......................... 296/189; 296/31 P; 296/191; 296/197
[58] Field of Search ............. 296/187, 188, 189, 197, 296/31 R, 31 P, 185, 191, 195; 52/563.4, 568, 574, 582.5

[56] References Cited

U.S. PATENT DOCUMENTS

| | | | |
|---|---|---|---|
| 2,439,655 | 4/1948 | Graham | 52/585 |
| 2,916,324 | 12/1959 | Graham | 296/189 |
| 3,525,661 | 8/1970 | Jackson | 52/574 X |
| 3,575,251 | 4/1971 | Moore | 180/30 |
| 3,637,252 | 1/1972 | Metsker | 296/31 P |
| 3,836,192 | 9/1974 | Wilfert | 296/28 R |
| 3,853,349 | 12/1974 | Moore | 296/189 |
| 3,881,566 | 5/1975 | Moore | 296/31 P |
| 3,884,521 | 5/1975 | Moore | 296/31 R |
| 3,913,292 | 10/1975 | Braekkan | 52/574 X |
| 4,290,235 | 9/1981 | Jahnle et al. | 49/502 |

FOREIGN PATENT DOCUMENTS

| | | | |
|---|---|---|---|
| 1914997 | 3/1969 | Fed. Rep. of Germany | 296/31 P |
| 0175472 | 10/1982 | Japan | 296/31 R |

Primary Examiner—Robert B. Reeves
Assistant Examiner—Russell D. Stormer
Attorney, Agent, or Firm—Buell, Ziesenheim, Beck & Alstadt

[57] ABSTRACT

The vehicle body comprises a stiff inner shell to which are affixed one or more layers of panels with overlapping edges. The inside face of each panel is of impact-resistant material. The outer face is any relatively thin material stiff enough to present a smooth surface and capable of being painted. The space between inner and outer faces is filled with any lightweight crush-resistant material preferably corrugated cardboard. In the event of damage to the cardboard, individual panels can be removed and replaced.

8 Claims, 6 Drawing Figures

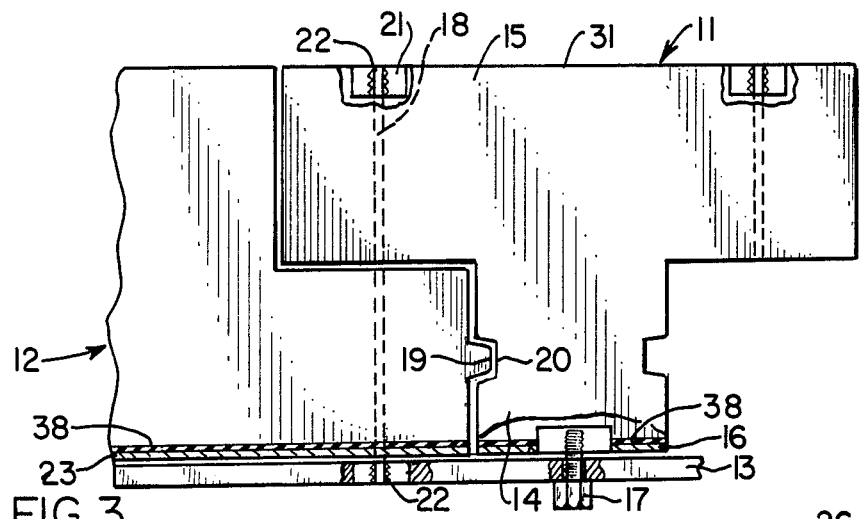
FIG. 3
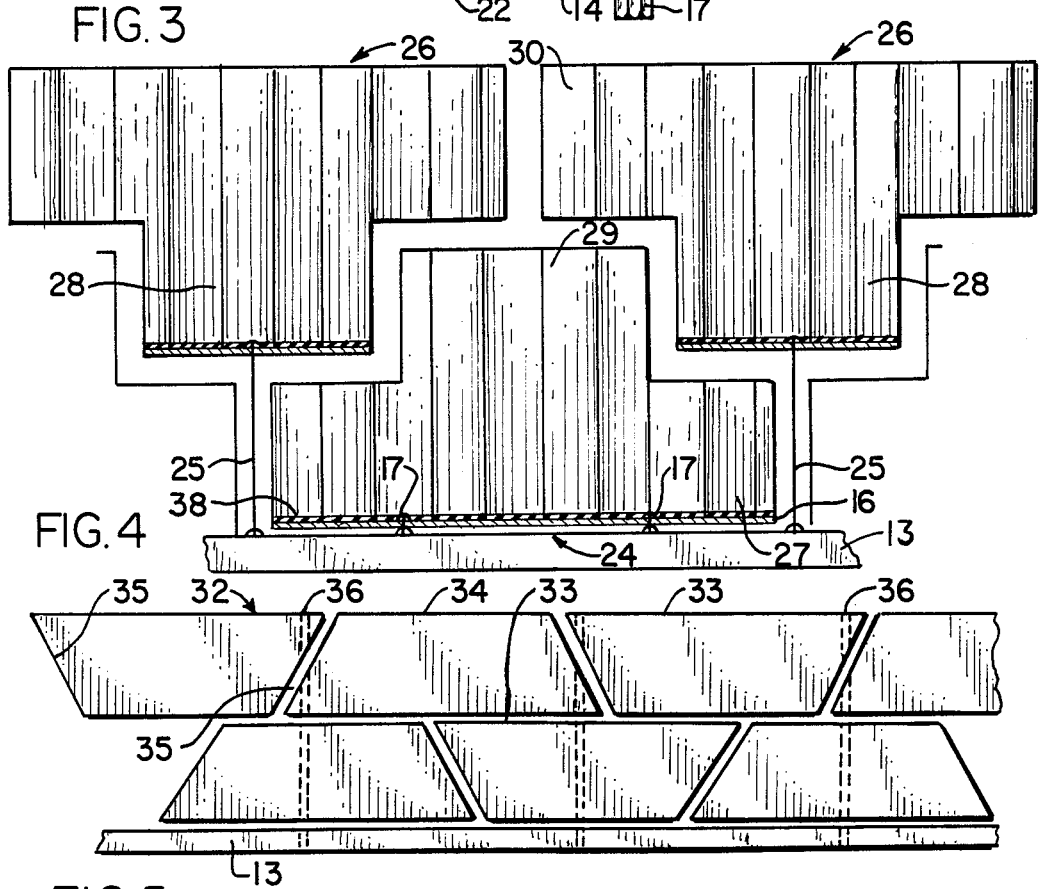
FIG. 4
FIG. 5
FIG. 6

CRUSH RESISTANT MOTOR VEHICLE BODY

This invention relates to motor vehicle bodies. It is more particularly concerned with motor vehicle bodies that afford occupants increased protection from collision and other impacts.

BACKGROUND OF THE INVENTION

In many motor vehicle accidents injuries to the occupants arise from buckling or crushing the vehicle body. Various remedies have been proposed for this condition, primarily strengthening of the vehicle body or improving the impact absorbing properties of the body. Practically all body strengthening construction increases the weight of the vehicle which is undesirable for fuel economy. Some expedients for increasing the buckling or crush resistance of a vehicle include a structure with internal and external skin separated by multiple thin-walled cans or tubes, as in Moore U.S. Pat. Nos. 3,575,251 and 3,853,349, or a shell filled with rigid foam material such as polyurethane, as in Metsker U.S. Pat. No. 3,637,252, or outer body coating of synthetic resin material, preferably a foam material, as in Wilfert U.S. Pat. No. 3,836,192, the hardness of which decreases from the outside toward the inside. Reinforcing bands of continuous glass fibers have also been proposed in Jahnle et al., U.S. Pat. No. 4,290,235. While some or all of the above-mentioned structures may increase the crush resistance of the car body, they are all expensive to repair after a crash.

SUMMARY OF THE INVENTION

My vehicle body comprises a reasonably stiff substantially incompressible inner shell to which are affixed one or more layers of panels with overlapping edges. The inside face of each panel is of impact-resistant material, preferably metal. The outer face or skin is any relatively thin material stiff enough to present a smooth surface and capable of being painted, and the space between inner and outer faces is filled with any suitable lightweight crush-resistant material. The panels are preferably the height of the body from floor to window ledge, and are overlapped along their vertical edges. The overlap is preferably a shiplap. In the event of damage to the car body, individual panels can be removed and replaced, thus simplifying body repair and reducing its cost.

BRIEF DESCRIPTION OF DRAWINGS

FIG. 3 is an enlarged detail of FIG. 1 showing fastening and interlocking of my panels.

FIG. 4 is an enlarged detail of another embodiment of my panels.

FIG. 5 is an enlarged detail of still another embodiment of my panels.

FIG. 6 is a detail showing the interior of a panel.

DESCRIPTION OF PREFERRED EMBODIMENT

Figure 1:
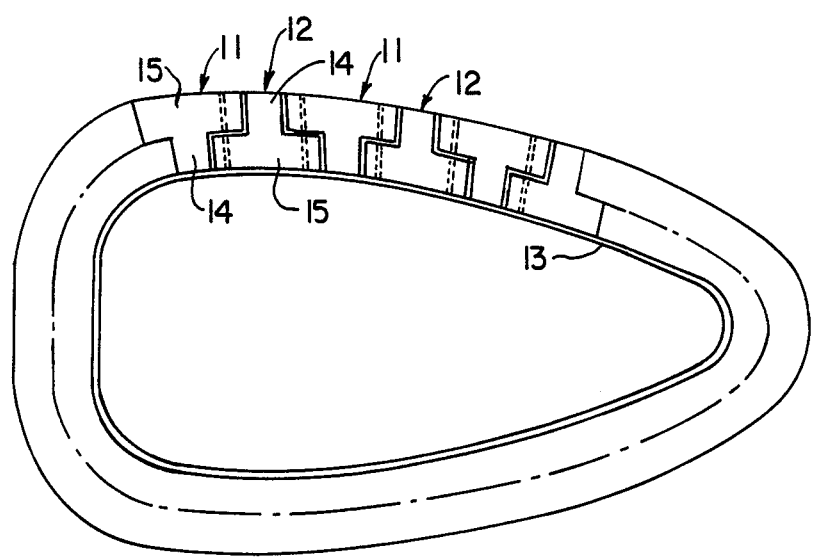
FIG. 1 is a horizontal section through my vehicle body taken on the plane I—I of FIG. 1.
Figure 2:
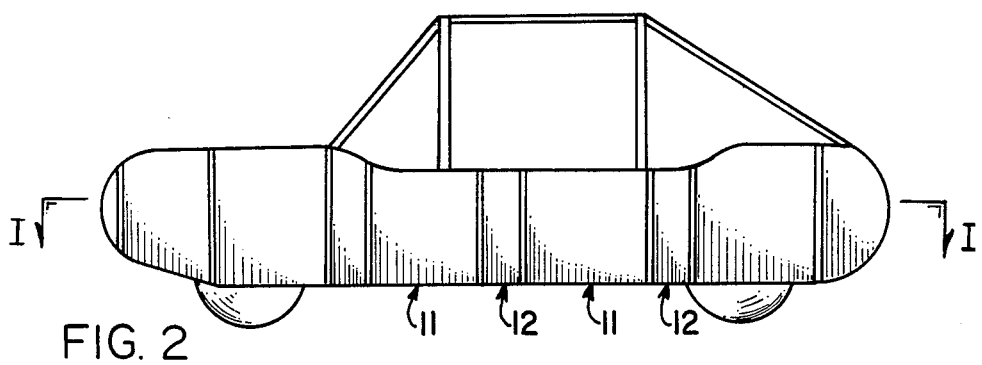
FIG. 2 is a side elevation of my vehicle body.

FIGS. 1 and 2 show my car body structure as adapted to a mini-car with front wheel drive and a single steerable rear wheel. The car body is seen to be made up of alternating panels 11 and 12 affixed to an inner shell 13 which may be of plywood treated to render it fire resistant, or other lightweight incompressible rigid material.

The panels 11 and 12 overlap along their vertical edges and extend from floor to window ledge but are of substantially the same horizontal cross section, as is seen in FIG. 1. Each panel is in the form of a T having a stem 14 and a cross bar 15. In panels 11 stem 14 is affixed to shell 13 and in panels 12 cross bar 15 is affixed to shell 13, the ends of cross bar 15 of each panel abutting the sides of stem 14 of its adjoining panels on each side. The successive panels thus present a smooth outer surface for painting. The form of overlap between panels 11 and 12 so arranged is seen to be the familiar shiplap of wooden siding. I prefer to form my panels 11 and 12 so that the overlaps along the opposite edges of the panel are symmetrical in plane I—I or in any other horizontal plane, but they may be formed with conventional asymmetric shiplaps.

The assembly of my panels 11 and 12 and the means for fixing them to shell 13 are shown in more detail in FIG. 3. Panels 11 are affixed to shell 13 at the bottom of their stems 14 by anchor bolts 17. Panels 12 may be affixed to shell 13 at the top of their cross bars 15 in the same way. If desired, adjoining panels 11 and 12 may be formed with mating projections 19 and grooves 20 along the edges of cross bar 15 and stem 14 respectively, so as to interlock. Adjoining panels 11 and 12 may be locked together and affixed to shell 13 by fastener rods 18 through mating holes in their cross bars 15. The holes in the outer face 31 of panels 11 could be counterbored as at 21 and the rods 18 have threaded ends fitted into threaded fasteners 22 appropriately covered.

FIG. 4 shows another embodiment of my invention utilizing panels very similar to panels 11 and 12 described hereinabove but assembled in a different manner. My crush resistant body here comprises the same incompressible rigid shell 13 on which is assembled an inside row of identical T-shaped panels 24 with the faces of their cross bars 27 abutting shell 13. The ends of adjoining cross bars 27 are shown as being slightly separated to illustrate one means of fastening panels to shell 13, but that separation may be small or substantially eliminated by grooving the cross bar ends to enclose means 25, to be described hereinafter. On the inner row of panels 24 is positioned an outer row of panels 26 which may be identical with panels 24. Each panel 26 is T-shaped with its stem 28 positioned between the stems 29 of adjoining panels 24 and its cross bar 30 overlying the outer ends of the stems 29 of the two adjoining panels 24. Panels 24 and 26 are dimensioned so that their overlapping of cross bar 30 over stem 29 on each side is one-half the width of that stem. In FIG. 4 the overall thickness of panels 24 and 26 is the same but it is not essential that this be so. Panels 24 are fastened to shell 13 by anchor bolts 17 as are shown in FIG. 3. Panels 26 are fastened to shell 13 by ties 25 which are attached to the end faces of the stems 28 of panels 26 and to shell 13 between the end face of the cross bars 27 of panels 24. Ties 25 may be metal rods or they may be ties of an elastomer.

FIG. 5 illustrates still a third embodiment of my invention utilizing wedge-shaped panels 32 having parallel wide and narrow faces 33 and 34 respectively joined by sloping faces 35. Alternate panels have wide face 33 and narrow face 34 attached to shell 13 by anchor bolts 17 as have been previously described, or if desired panels 32 can be attached by rods 36 which pass through adjoining inclined interfaces of alternating panels.

As I have mentioned the face of my panels adjoining the body shell 13 is preferably of metal, for example, face 16 of stem 14 of panel 11 and face 23 of cross bar 15 of panel 12 in FIG. 3. I prefer to coat each such face 16 and 23 and similar faces on other embodiments of my invention described herein with a layer of rubber 38. The space between the faces above mentioned and the outer skin of each panel is filled with a crush-resistant material, for example, corrugated cardboard positioned with its corrugations normal to faces 16 and 23. This cardboard should be processed to render it fire resistant. Alternatively I use crush resistant plastic material or foamed material such as polyurethane.

My preferred filling material is corrugated cardboard, positioned with corrugations normal to my panel inner and outer surfaces as is shown in FIG. 6. In that figure the outer face 31 of a panel 11 is partially broken away to show its corrugated cardboard filling. That filling comprises flat strips of cardboard 38 to which are glued strips 39 of corrugated cardboard on each side. The cardboard is treated to render it fire-resistant. If desired, the spaces between corrugations may be filled wholly or partially with lightweight plastic or foamed material 40, but even in the absence of such filler the air trapped between corrugations provides a substantial cushioning effect. That effect may be increased by maintaining the air or other gas within the panel under pressure above atmospheric.

In FIGS. 4 and 5 I have shown two layers of my panels fitting one above the other. It will be understood that two or more layers of my panels as shown in FIGS. 1 and 3 may also be superimposed. For example, the front and rear ends of my vehicles may carry three or more layers of panels to afford extra protection in those areas. Where more than a single layer of panels is employed it is desirable that the layer nearer the vehicle occupants have a greater shock resistance than external layers. This differential can be obtained by using a heavier gauge corrugated cardboard in the underlying panels than in those above, or by using more of the lightweight plastic material above mentioned in the underlying panels than in the overlying panels.

FIG. 5 shows two layers of wedge-shaped panels 32 fastened to shell 13 by rods 36 which pass through holes in the adjoining interfaces 35 of the panels in the outer row and through the centers of the panels in the inner row, and are anchored in shell 13 by any convenient means.

In the foregoing specification I have described presently preferred embodiments of my invention; however, it will be understood that my invention can be otherwise embodied within the scope of the following claims.

I claim:

1. A crush resistant motor vehicle body comprising an inner shell of substantially incompressible material surrounding the vehicle, at least one layer of panels facing outwardly from the shell, adjoining panels having vertical edges overlapping in a horizontal direction outwardly from the inner shell, each panel having a plate of impact-resistant material on its shell face, an outer skin adapted to receive a paint finish, and impact-absorbing material occupying the space therebetween and means affixing said panels to said inner shell so as to permit removal and replacement of individual panels.

2. The vehicle body of claim 1 in which the overlapping panels are trapezoidal in said horizontal direction and have parallel wide and narrow faces respectively joined by sloping edges.

3. The vehicle body of claim 1 in which adjoining panels overlap in ship-lap fashion and in which the means affixing at least some of the said overlapping panels are elastomeric means positioned between abutting edges of panels adjoining the shell.

4. The vehicle body of claim 1 in which the overlapping panels overlap in shiplap fashion.

5. The vehicle body of claim 4 in which the overlaps on the opposite edges of a panel are symmetrical in said horizontal plane.

6. The vehicle body of claim 4 in which the overlapping panels are affixed to said shell by elongated connectors passing through the overlaps of said panels and anchored in said shell.

7. The vehicle body of claim 4 in which edges of the overlapped adjoining panels have mating projections and grooves.

8. The vehicle body of claim 1 including at least an overlying layer of outwardly facing panels and an underlying layer of outwardly facing panels, the panels of overlying and underlying layers being substantially identical in form, the impact-absorbing properties of the underlying panels being greater than the impact-absorbing properties of the overlying panels.

* * * * *